US007012250B1

(12) United States Patent
Aksyuk et al.

(10) Patent No.: US 7,012,250 B1
(45) Date of Patent: Mar. 14, 2006

(54) WAFER SUPPORTED, OUT-OF-PLANE ION TRAP DEVICES

(75) Inventors: Vladimir Anatolyevich Aksyuk, Piscataway, NJ (US); Stanley Pau, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/003,823

(22) Filed: Dec. 3, 2004

(51) Int. Cl.
*B01D 59/44* (2006.01)
*H01J 49/00* (2006.01)
*H01J 49/26* (2006.01)
*H01J 49/42* (2006.01)

(52) U.S. Cl. ...................... 250/292; 250/281; 250/282; 250/283; 250/288; 250/293

(58) Field of Classification Search ..................... None
See application file for complete search history.

(56) References Cited

U.S. PATENT DOCUMENTS

| | | | | |
|---|---|---|---|---|
| 2,939,952 | A | 6/1960 | Paul et al. | 250/41.9 |
| 5,994,159 | A | 11/1999 | Aksyuk et al. | 438/52 |
| 6,469,298 | B1 | 10/2002 | Ramsey et al. | 250/292 |
| 6,870,158 | B1 * | 3/2005 | Blain | 250/292 |
| 2005/0061767 | A1 * | 3/2005 | Pai et al. | 216/2 |
| 2005/0063865 | A1 * | 3/2005 | Bonne et al. | 422/68.1 |
| 2005/0142662 | A1 * | 6/2005 | Bonne | 436/149 |
| 2005/0189488 | A1 * | 9/2005 | Pai et al. | 250/292 |

OTHER PUBLICATIONS

R. E. March, "Quadrupole Ion Trap Mass Spectrometer," *Encyclopedia of Analytical Chemistry*, R. A. Meyers (Ed.), pp. 11848-11872, John Wiley & Sons, Ltd., Chichester (2000).

Y. Yi et al., $10^{th}$ *Int. Conf. on Solid-State Sensors and Actuators/Transducers*, pp. 1466-1469, Sendai, Japan (Jun. 1999).

Y. Yi et al., *Proceedings of SPIE*, vol. 3511, pp. 125-134 (1998).

R. S. Muller et al., *Proc. of the IEEE*, vol. 86, No. 8, pp. 1705-1720 (Aug. 1998).

(Continued)

*Primary Examiner*—John R. Lee
*Assistant Examiner*—Bernard E. Souw

(57) ABSTRACT

An ion trap device comprises a wafer that supports at least one plate forming an ion trapping region therebetween. The plate has an electrically insulating surface and a multiplicity of electrodes disposed on the insulating surface. The electrodes form at least one ion trap in the trapping region when suitable voltages are applied to the electrodes via conductors coupled to the wafer. The device has a multiplicity of ports for introducing ions into the trapping region and for extracting ions from that region. In embodiments that include a multiplicity of such plates, a first one of the plates is oriented at a non-zero angle to the major surface of the wafer and is rotateably mounted on that surface. In one embodiment, at least two of the plates form an elongated micro-channel having an axis of ion propagation, and the electrodes on at least one of the two plates are segmented along the direction of the axis, thereby forming a multiplicity of ion traps along the axis. A controller applies suitable voltage (e.g., sequentially) to the segmented electrodes, thereby shifting ions from one trap to another. Preferably, the electrodes on the two plates are segmented. Applications to mass spectrometers and shift registers are described.

20 Claims, 5 Drawing Sheets

OTHER PUBLICATIONS

H. Zhang, "MEMS Devices and Design," Course No. 04813190, Lecture 2, pp. 39-43 (Spring 2004), which can be found at internet website http://ime.pku.edu.cn/mems/courses/device&design/Lecture__13__Device__Design.pdf.

L. Li et al., *J. of Microelectromechanical Syst.*, vol. 13, No. 1, pp. 83-90 (Feb. 2004).

M. Gel et al., *J. Micromech. Microeng.*, vol. 11, pp. 555-560 (2001).

C. Pai et al., U.S. Appl. No. 10/789,091, filed Feb. 27, 2004 (no copy enclosed).

C. Pai et al., U.S. Appl. No. 10/656,432, filed Sep. 5, 2003 (no copy enclosed).

* cited by examiner

WAFER SUPPORTED, OUT-OF-PLANE ION TRAP DEVICES

BACKGROUND OF THE INVENTION

1. Field of the Invention

This invention relates to ion trap devices and, more particularly, to such devices that are formed by out-of-plane assembly of micro-cavities on a semiconductor or dielectric wafer.

2. Discussion of the Related Art

Conventional ion traps enable ionized particles to be stored and the stored ionized particles to be separated according to the ratio (M/Q) of their mass (M) to their charge (O). Storing the ionized particles involves applying a time-varying voltage to the ion trap so that particles propagate along stable trajectories therein. Separating the ionized particles typically involves applying an additional time-varying voltage to the trap so that the stored particles are selectively ejected according to their M/Q ratios. The ability to eject particles according to their M/Q ratios enables the use of ion traps as mass spectrometers.

Exemplary ion traps are described, for example, by W. Paul et al. in U.S. Pat. No. 2,939,952 issued Jun. 7, 1960. One such ion trap, known as a quadrupole, is described by R. E. March in "Quadrupole Ion Trap Mass Spectrometer," *Encyclopedia of Analytical Chemistry*, R. A. Meyers (Ed.), pp. 11848–11872, John Wiley & Sons, Ltd., Chichester (2000). Both of these documents are incorporated herein by reference.

FIG. 1 herein shows one type of quadrupole ion trap 10 that has an axially symmetric cavity 18 akin to that depicted in FIG. 2 of March. More specifically, the ion trap 10 includes metallic top and bottom end cap electrodes 12–13 and a metallic central ring-shaped electrode 14 that is located between the end cap electrodes 12–13. Points on inner surfaces 15–17 of the electrodes 12–14 have transverse radial coordinates r and axial coordinates z. These coordinates satisfy hyperbolic equations; i.e., $r^2/r_0^2-z^2/z_0^2=+1$ for the central ring-shaped electrode 14 and $r^2/r_0^2-z^2/z_0^2=-1$ for the end cap electrodes 12–13. Here, $2r_0$ and $2z_0$ are, respectively, the minimum transverse diameter and the minimum vertical height of the trapping cavity 18 that is formed by the inner surfaces 15–17. Typical trapping cavities 18 have a shape ratio, $r_0/z_0$, that satisfies: $(r_0/z_0)^2\approx 2$, but the ratio may be smaller to compensate for the finite size of the electrodes 12–14. Typical cavities 18 have a size that is described by a value of $r_0$ in the approximate range of about 0.707 centimeters (cm) to about 1.0 cm. We refer to cavities of this approximate size as macro-cavities.

For the above-described electrode and macro-cavity shapes, electrodes 12–14 produce an electric field with a quadrupole distribution inside trapping cavity 18. One way to produce such an electric field involves grounding the end cap electrodes 12–13 and applying a radio frequency (RF) voltage to the central ring-shaped electrode 14. In an RF electric field having a quadrupole distribution, ionized particles with small Q/M ratios will propagate along stable trajectories. To store particles in the trapping cavity 18, the cavity 18 is voltage-biased as described above, and ionized particles are introduced into the trapping cavity 18 via ion generator 19.1 coupled to entrance port 19.2 in top end cap electrode 12. During the introduction of the ionized particles, the trapping cavity 18 is maintained with a low background pressure; e.g., about $10^{-3}$ Torr of helium (He) gas. Then, collisions between the background He atoms and ionized particles lower the particles' momenta, thereby enabling trapping of such particles in the central region of the trapping cavity 18. To eject the trapped particles from the cavity 18, a small RF voltage may be applied to the bottom end cap 13 while ramping the small voltage so that stored particles are ejected through exit orifice 19.4 selectively according to their M/Q ratios. The ejected ions are then incident on a utilization device 19.3 (e.g., an ion collector), which is coupled to orifice 19.4.

For quadrupole ion trap 10, machining techniques are available for fabricating hyperbolic-shaped electrodes 12–14 out of base pieces of metal. Unfortunately, such machining techniques are often complex and costly due to the need for the hyperbolic-shaped inner surfaces 15–17. For that reason, other types of ion traps are desirable.

A second type of ion trap has a trapping macro-cavity with a right circularly cylindrical shape. This trapping cavity is also formed by inner surfaces of two end cap electrodes and a central ring-shaped electrode located between the end cap electrodes. Here, the end cap electrodes have flat disk-shaped inner surfaces, and the ring-shaped electrode has a circularly cylindrical inner surface. For such a trapping cavity, applying a voltage to the central ring-shaped electrode while grounding the two end cap electrodes will create an electric field that does not have a pure quadrupole distribution. Nevertheless, a suitable choice of the trapping cavity's height-to-diameter ratio will reduce the magnitude of higher multipole contributions to the created electric field distribution. In particular, if the height-to-diameter ratio is between about 0.83 and 1.00, the octapole contribution to the field distribution is small; e.g., this contribution vanishes if the ratio is about 0.897. For such values of this shape ratio, the effects of higher multipole distribution are often small enough so that the macro-cavity is able to trap and store ionized particles. See, for example, J. M. Ramsey et al., U.S. Pat. No. 6,469,298 issued on Nov. 22, 2002, which is incorporated herein by reference.

For this second type of ion trap, standard machining techniques are available to fabricate the electrodes from metal base pieces, because the electrodes have simple surfaces rather than the complex hyperbolic surfaces of the electrodes 12–14 of FIG. 1. For this reason, fabrication of this second type of ion trap is usually less complex and less expensive than is fabrication of quadrupole ion traps whose electrodes have hyperbolic-shaped inner surfaces.

Nevertheless, the metallic components of such ion traps are expensive to manufacture and assemble. Moreover, these metallic components cause equipment in which they are incorporated to be large and bulky. The latter property has limited the widespread application and deployment of these ion traps in equipment such as mass spectrometers and shift registers.

Thus, a need remains in the art for a micro-miniature ion trap that can be inexpensively and readily implemented without reliance on the metallic components common to the prior art. In particular, there is a need for such an ion trap that has a micro-cavity that can be readily and inexpensively fabricated and assembled.

BRIEF SUMMARY OF THE INVENTION

In accordance with one aspect of our invention, a micro-miniature ion trap device comprises a wafer (or substrate) having a major surface and at least one plate (essentially planar or curved) forming an ion trapping region in proximity thereto. The at least one plate has an electrically insulating surface and a multiplicity of electrodes disposed on its insulating surface. The electrodes form at least one ion trap in the trapping region when suitable voltages are applied to the electrodes via electrical conductors coupled to the wafer. The device has a multiplicity of ports for introducing ions into the trapping region and for extracting ions from that region. A first one of the plates is oriented at a non-zero angle to the major surface of the wafer and is rotateably mounted on that surface. Devices of this type may be useful, for example, as mass spectrometers, atomic clocks, mass filters, or shift registers.

By rotateably mounted we mean that the plate can be rotated during assembly of the device, and that it can be fixed in an upright position during operation of the device.

In accordance with another aspect of invention, at least two of the plates form an elongated micro-channel having an axis of ion propagation, and the electrodes on at least one of the two plates are segmented along the direction of the axis, thereby forming a multiplicity of ion traps along the axis. A controller applies suitable voltage (e.g., sequentially) to the segmented electrodes, thereby shifting ions from one trap to another. Preferably, the electrodes on both of the plates are segmented.

BRIEF DESCRIPTION OF THE SEVERAL VIEWS OF THE DRAWING

Our invention, together with its various features and advantages, can be readily understood from the following more detailed description taken in conjunction with the accompanying drawing, in which.

DETAILED DESCRIPTION OF THE INVENTION

Ion Trap Structure and Operation

Figure 1:
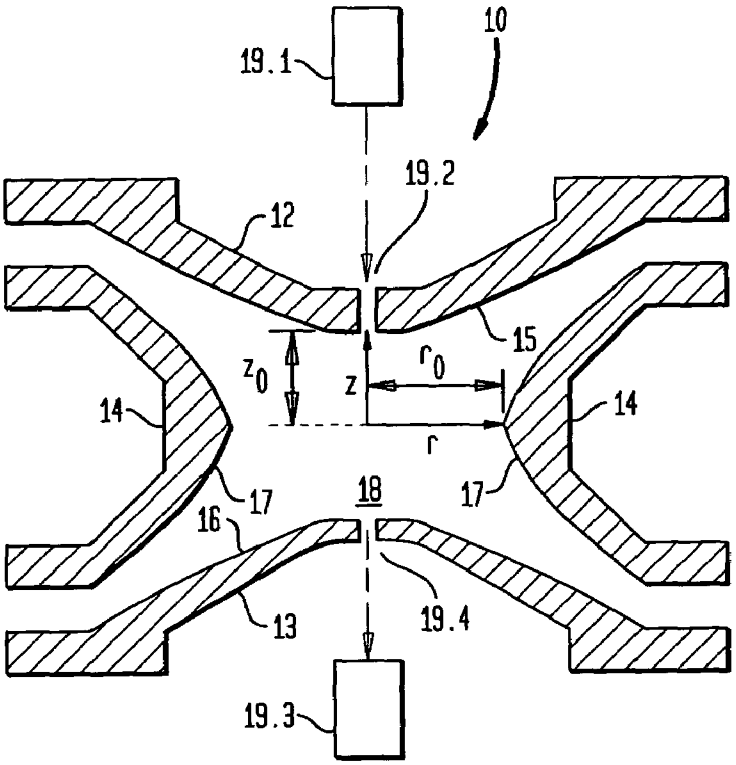
FIG. 1 (PRIOR ART)
FIG. 1 is a schematic, cross sectional view of a prior art ion trap having a macro-cavity.
Figure 2:
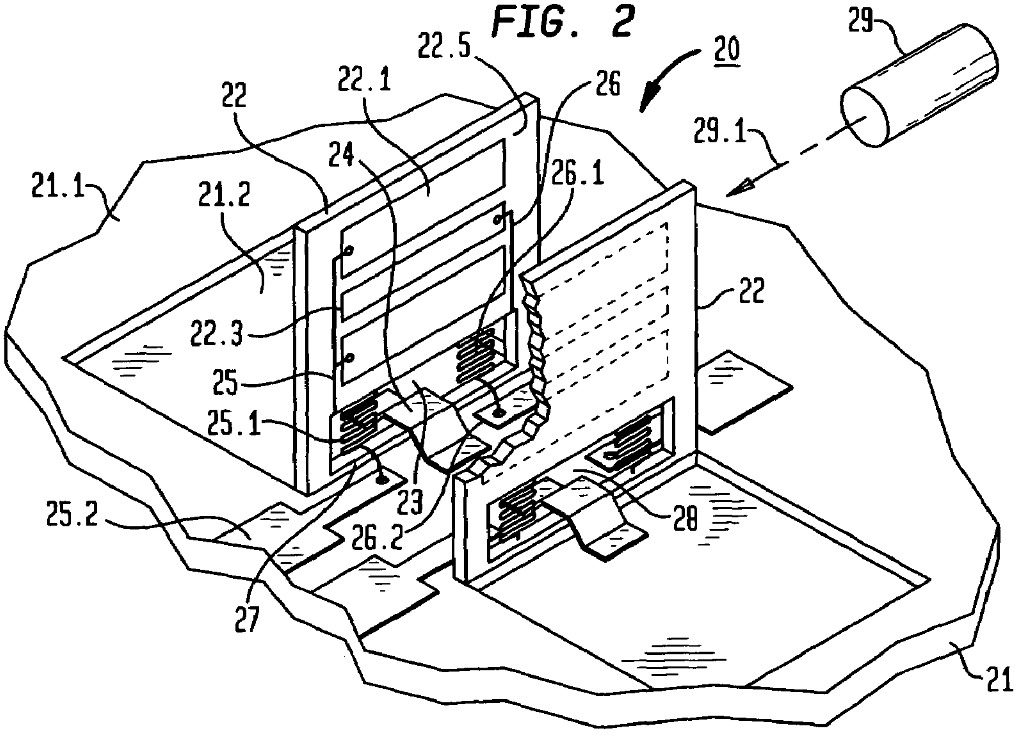
FIG. 2 is a schematic, isometric view of a micro-miniature ion trap device in accordance with an illustrative embodiment of our invention.

With reference now to the illustrative embodiment of our invention shown in FIG. 2, a micro-miniature ion trap 20 comprises at least one plate 22, which is rotateably or pivotally mounted on a major surface 21.1 of a wafer (or substrate) 21 during assembly but fixedly mounted on surface 21.1 during operation of the trap. (A pair of plates 22 is shown for purposes of illustration only.) The wafer may be made of semiconductor material, dielectric material, or a combination of both. The ability to pivot or rotate each plate results from processing techniques, which are adapted from the integrated circuit industry and will be described more fully hereinafter. Suffice it to say here that, in one embodiment, such processing results in each plate having a window or aperture 28 formed near the bottom of the electrode so as to define an elongated rail or axle 27, which extends under a hinge 24. When the plate 22 is released from its original as-fabricated position 21.2 on the surface 21.1, it can be rotated to an upright position as shown and then secured in that position, as described more fully hereinafter.

Alternatively, the hinge and axle arrangement of FIG. 2 may be replaced by micro-fabricated flexible elements (not shown), where one side of such a flexible element is mechanically attached to the plate, and the other side is mechanically attached to the wafer surface. Such flexible elements allow the plate to be rotated to the desired upright position with respect to the substrate surface, without being entirely detached from that surface.

When in an upright position, the two plates 22 may be oriented essentially perpendicular to major surface 21.1 (as shown). Alternatively, the plates do not have to be oriented perpendicular to major surface 21.1; that is, for example, one (or more) of the plates 42 (FIG. 4) or 112 (FIG. 11) may be oriented at an acute angle to major surface 21.1. In addition, one (or more) of the plates 114 (FIG. 11) may be essentially parallel to major surface 21.1; that is, plate 114 remains on the surface of wafer 21 rather than being either released or rotated out of the wafer. In general, the combination of plates may form a three dimensional structure having a polygonic cross-section. Typical shapes include various types of cylinders (e.g., those having circular, oval, rectangular, hexagonal or other cross-sections) and various forms of polyhedrons (e.g., tetrahedrons or pyramids).

Figure 13:
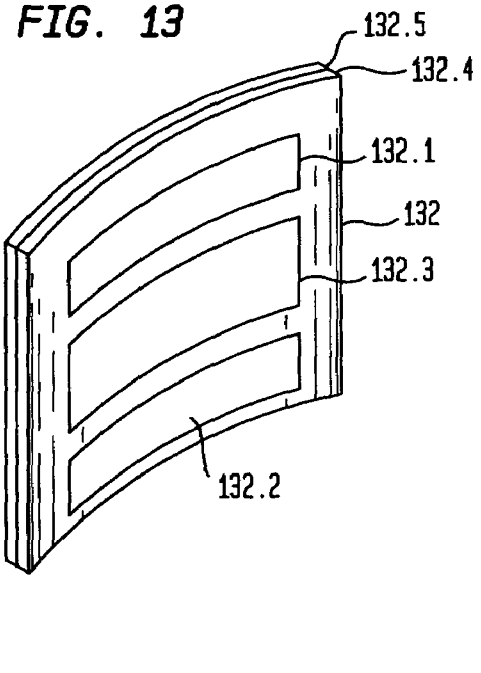
FIG. 13 is a schematic, isometric view of a curved plate in accordance with another embodiment of our invention.

In addition, the plates may be essentially planar, as shown in FIG. 2, or they may be curved, as shown in FIG. 13. In the latter case, a curved plate 132 is formed as an essentially planar multi-layered structure with at least two layers 132.4 and 132.5 having sufficiently different physical properties (e.g., thermal expansion coefficients), so that when the plate is released from the wafer during assembly, the stress inherent between the essentially planar layers 132.4–132.5 causes them curl as shown in FIG. 13. Illustratively, the electrodes 132.1, 132.2, and 132.3 are formed on layer 132.4 during processing.

The plates may be rotated either manually or automatically. In the later case, external energy (e.g., supplied by an electric or magnetic field, or a thermal source) or internal energy (e.g., supplied by an integrated mechanical spring with built-in stress or by chemical changes such as polymer shrinkage) may be used to effect self-assembly. See, for example, the approaches described by the following: V. A. Aksyuk et al., U.S. Pat. No. 5,994,159 issued on Nov. 30, 1999; Y. Yi et al., *The 10th Int. Conf. on Solid-State Sensors and Actuators/Transducers*, pp. 1466–1469, Sendai, Japan (June 1999); Y. Yi et al., *Proceedings of SPIE*, Vol. 3511, pp. 125–134 (1998); L. Li et al., *J. of Microelectromechanical Syst.*, Vol. 13, No. 1, pp. 83–90 (February 2004); R. S. Muller et al., *Proc. of the IEEE*, Vol. 86, No. 8, pp. 1705–1720 (August 1998); and M. Gel et al., *J. Micromech. Microeng.*, Vol. 11, pp. 555–560 (2001), all of which are incorporated herein by reference.

Figure 3:
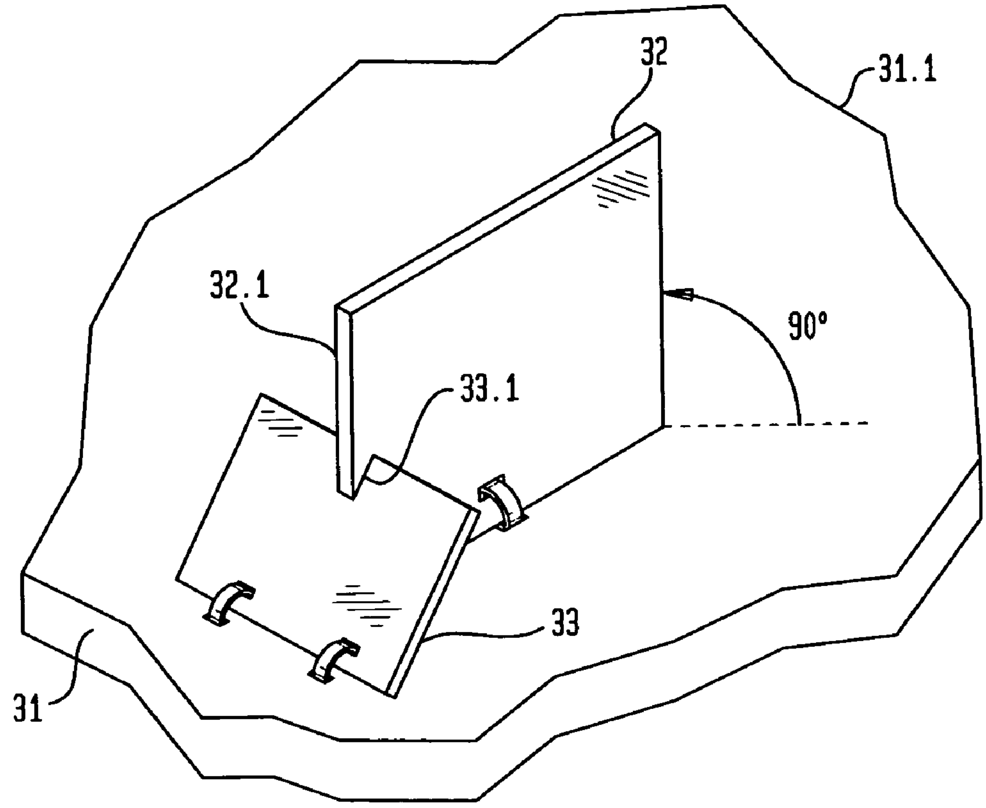
FIG. 3 is a schematic, isometric view of a wafer-supported vertically oriented plate in accordance with one embodiment of our invention.

In order to secure the plates in whatever upright position is desired, a brace or support is provided. Thus, FIG. 3 depicts an illustrative embodiment of a slotted brace 33 that is pivotally mounted on wafer (or substrate) 31. When the brace 33 is rotated out of the plane of the wafer, slot 33.1 engages an edge 32.1 of upright plate 32 and holds it in place. This type of brace is particularly useful when the plate 32 is oriented essentially perpendicular to the major surface 31.1, but can be readily adapted to support plates oriented at other (acute) angles as well.

Figure 4:
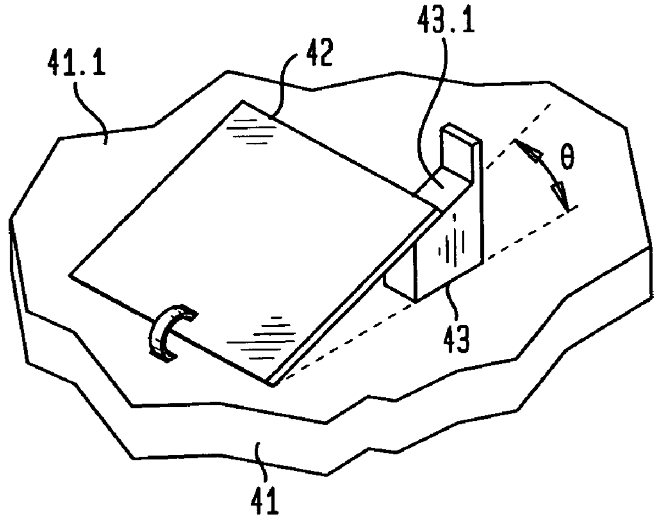
FIG. 4 is a schematic, isometric view of a wafer-supported obliquely oriented plate in accordance with another embodiment of our invention.

Alternatively, as shown in FIG. 4, when plate 42 is oriented at an acute angle to the major surface 41.1 of wafer (or substrate) 41, a support 43 having a shelf 43.1 may be utilized. That is, the height and slant of the shelf 43.1 may be adapted to support the plate at the desired acute angle θ to the major surface 41.1.

Once the plates are properly positioned they define an ion trapping micro-cavity between them. As shown in FIG. 2, ions 29.1 are injected into the trapping region from an ion generator 29. In order to trap these ions each plate is provided with an array of electrodes 22.1–22.3, which are disposed on an insulating surface 22.5 of each plate 22. More specifically, the array includes upper and lower electrodes 22.1 and 22.2, respectively. These two electrodes are typically connected to a source of (DC) reference potential, typically ground. A third (middle) electrode 22.3 is disposed between the upper and lower electrodes. A time varying (e.g., RF) voltage is applied to the third electrode. The combination of these voltages forms a parabolic trapping potential well in the micro-cavity between the two plates 22, as is well known in the art. (In the case where only a single plate is used, all of the electrodes would, of course, be located on that plate, and the trapping potential well would be formed in near proximity to the plate.)

To this end the separation of the plates 22 from one another and the height of the trap (i.e., the distance from the top of upper electrode 22.1 to the bottom of lower electrode 22.2) should be approximately equal. Illustratively, the dimensions of the electrodes range from about 3 to 200 μm. However, the shape of the electrodes need not be rectangular; in general, the shape should preferably optimize the quadrupole potential field for trapping an ion. On the other hand, the dimensions of the plates are preferably at least two to three times that of the electrodes.

Once trapped, an ion is released as in the prior art; that is, by applying an additional small, ramped AC voltage to the RF electrode 22.3.

In general, the requisite voltages are applied to the DC electrodes 22.1–22.2 via bonding pad 25.2 and conductor 25, and to the RF electrode 22.3 via bonding pad 26.2 and conductor 26. Alternatively, the bonding pads may be replaced by integrated electronic circuits generating the requisite electrical signals. The conductors 25–26, which may be made of metal or polysilicon, each include a flexible segment 25.1–16.1, which enable the plates 22 to be rotated without breaking the electrical connection between the bond pads 25.2–26.2 and the electrodes 22.1–22.3, respectively. Illustratively, the flexible segments 25.1–26.1 are depicted as being serpentine sections of suspended wire located within window 28 of plate 22. The segments are relatively short, typically 1 to 5 μm long, to reduce fringing electrical fields, which can perturb the trapping potential.

For convenience we have depicted the conductors and electrodes as being located on the same surface and hence of the same plane of a plate, but they could be located on different planes. For example, the electrodes could be located on the front surface of the plate, with the conductors being located on the back surface. The latter design would improve shielding; i.e., reduce fringing electric fields.

In an alternative embodiment, the flexible segments 25.1–26.1 are replaced by micro-fabricated metal (e.g. solder) joints (not shown). Such joints would be first melted to allow the plates 22 to be rotated into the desired upright position. After the plates are rotated, the joints would be allowed to cool down and solidify, providing the required electrical connection between conductors 25, 26 and electrodes 22.1–22.2, 22.3, respectively. They also may serve an additional function of fixing the plate 22 in its desired upright position.

Ion Trap Fabrication

With reference now to FIGS. 5–9, we briefly describe how to fabricate a rotateable plate 82 (FIG. 8) using well-known silicon integrated circuit processing techniques as they are commonly applied to micro-electro-mechanical systems (MEMS) technology. See, for example, H. Zhang, "MEMS Devices and Design," Course No. 04813190, Lecture 2, pp. 39–43 (Spring 2004), which is incorporated herein by reference and can be found at internet website http://ime.pku.edu.cn/mems/courses/device&design/Lecture_13_Device Design.pdf.

Figure 5:
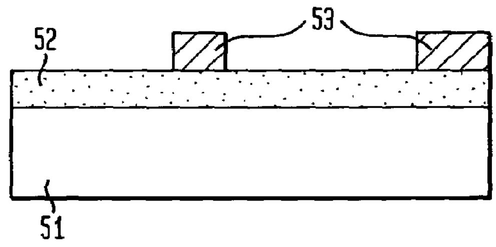
FIGS. 5–8 show schematic, cross-sectional views of a wafer at various stages of processing to form a plate that is rotateably mounted on the wafer.

Beginning with FIG. 5, a first sacrificial layer 52 of a silicon oxide is deposited on a single crystal silicon wafer 51. Then a first polysilicon (poly) layer is deposited and patterned to form the patterned poly layer 53, which will ultimately be released to form plate 82.

Figure 6:
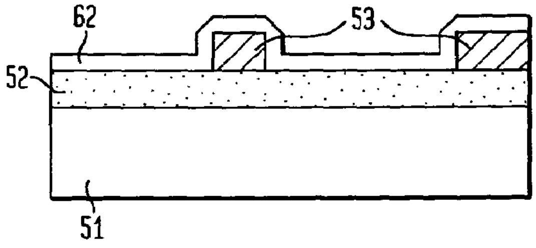
Figure 7:
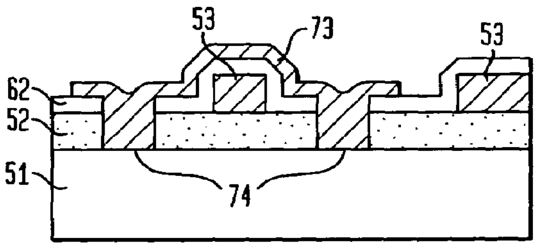
Figure 8:
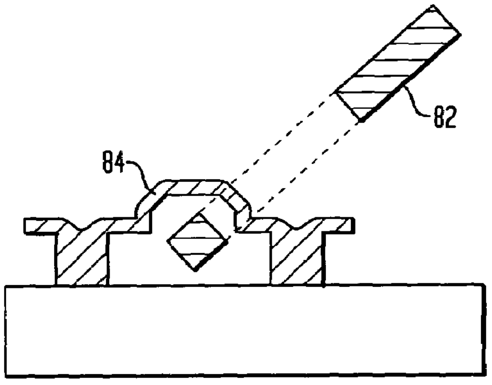
Figure 9:
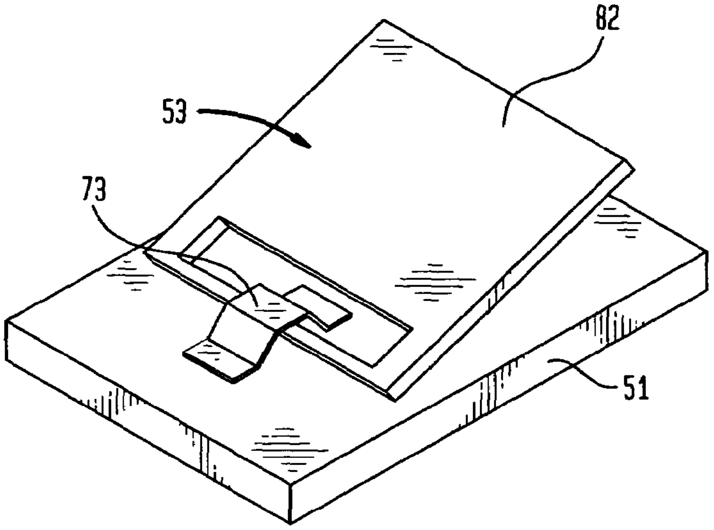
FIG. 9 shows a schematic, isometric view of a plate formed by the process described in conjunction with FIGS. 5–8.

Next, as shown in FIG. 6, a second sacrificial layer 62 of a silicon oxide is deposited on the patterned poly layer 53 and the exposed portions of first sacrificial layer 52. The two sacrificial layers 52 and 62 are patterned to open windows 74, as shown in FIG. 7. Then, a second poly layer 73 is deposited over the wafer and into the windows 74. Poly layer 73 is patterned to form hinge 84 (FIG. 8). Finally, both sacrificial layers 52 and 62 are etched away in order to release the plate 82, as shown in FIG. 8. An isometric view of the plate 82, after having been released from wafer 51 and rotated, is shown in FIG. 9. Also shown are the first poly layer 53, which forms the plate itself, and the second the second poly layer 73, which forms the hinge.

Note, for simplicity we have omitted from the foregoing description the fact that, before etching away the two sacrificial layers, metallization layers and insulating dielectric layers would have to be deposited and patterned in order to form electrodes 22 and conductors 25–26.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, although the micro-miniature ion traps of FIGS. 1–9 can be readily used in mass spectrometer applications, they can also be modified to construct shift register devices, as described below.

Shift Register Devices

Figure 11:
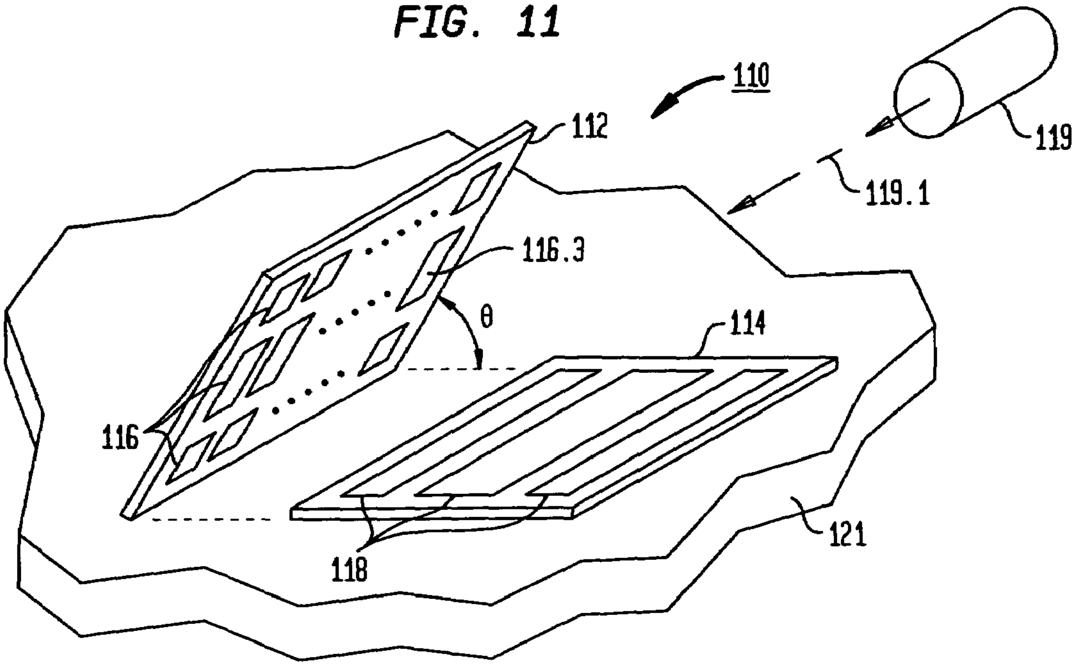
FIG. 11 is a schematic, top view of a shift register in accordance with yet another embodiment of our invention.

With reference now to FIG. 11, we illustrate an embodiment of an ion-trap-based shift register device 110 in which at least two plates 112–114 are positioned to form an ion propagation micro-channel therebetween. Illustratively, plate 112 is oriented at an angle θ ($0° < \theta \leqq 90°$) to the top major surface of wafer 121, and plate 114 lies within the top major surface. The electrodes 116 on at least one of the plates 112 are segmented to form a multiplicity of ion traps along the channel axis. On the other plate 114 the electrodes 118 are illustratively not segmented.

When suitable AC voltages are applied (e.g., sequentially) to the segmented middle electrodes 116.3, a multiplicity of ion traps is created in tandem in the channel. When ions 119.1 from ion generator 119 are injected into the channel, they are shifted from one ion trap to another until they exit the shift register device and are incident on a utilization device (not shown).

Figure 10:
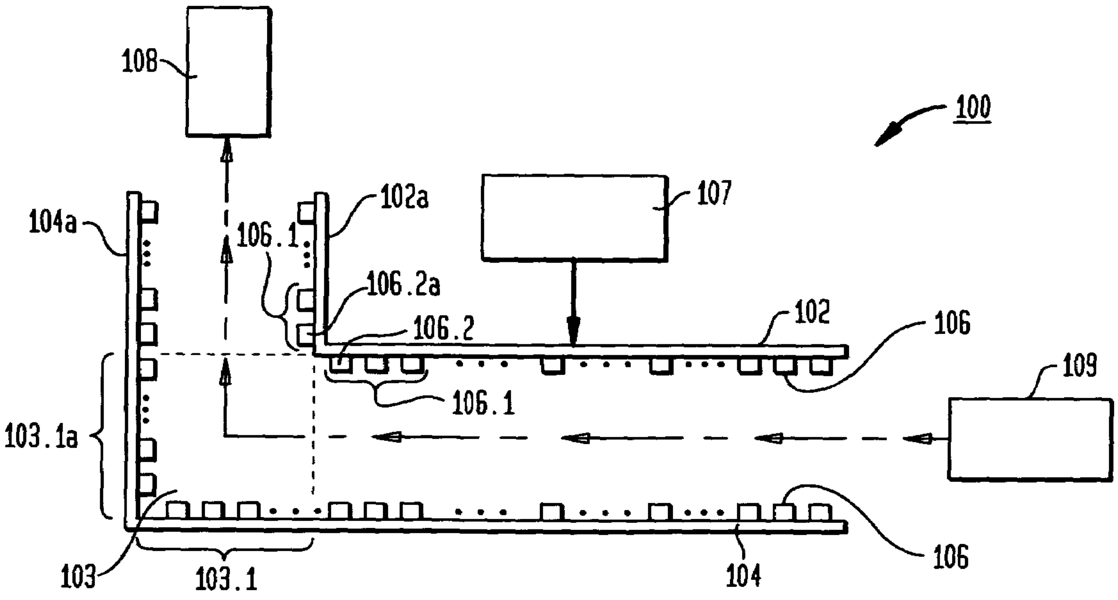
FIG. 10 is a schematic, isometric view of a shift register in accordance with still another embodiment of our invention.

Preferably, however, the electrodes on both plates are segmented, as shown in an alternative embodiment of FIG. 10. Here the shift register device 100 is shown in top view to depict a pair of plates 102–104, which are oriented essentially parallel to one another and perpendicular to the major surface of the supporting wafer (not shown). The plates define therebetween an ion propagation micro-channel, which guides ions injected from ion generator 109 to utilization device 108. On each of the plates the DC and AC electrodes 106 previously described are segmented. A controller 107 applies suitable voltages to the electrodes to create a multiplicity of ion traps along the axis of propagation. The AC voltages are applied (e.g., sequentially) to the segmented middle electrodes in order to move the ions along the micro-channel in shift register fashion.

FIG. 10 also depicts a second set of plates 102*a*–104*a*, which are oriented illustratively at right angles to plates 102–104 to demonstrate that the propagation path can be made to turn corners. To this end, the corner section 103 appears to have extra electrodes 103.1–103.1*a* on the outer plates 104–104*a*, respectively, that have no counterparts on the inner plates 102–102*a*. However, this problem can be addressed in several ways. First, the spacing and size of the AC and DC electrodes 106.1 on the inner plate 102 near the corner section 103 can be reduced so that a sufficient number of electrodes can be located near the corner, thereby preserving a 1:1 correspondence between the segmented electrodes on the outer and inner plates. Alternatively, the illustrative sequential pulsing protocol of the AC electrodes can be paused as an ion enters corner section 103. More specifically, the innermost AC electrodes 106.2–106.2*a* on the inner plates 102–102*a*, respectively, may be pulsed repeatedly while sequentially pulsing the AC electrodes 103.1–103.1*a* on the outer plates 104–104*a*, respectively, of the corner section 103 until the ion propagates around the corner section 103 and the enters the micro-channel between plates 102*a* and 104*a*, whereupon the normal sequential pulsing of the AC electrodes on plates 102*a*–104*a* would resume.

Figure 12:
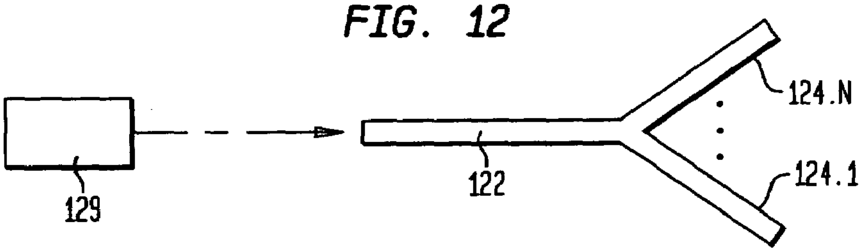
FIG. 12 is a schematic top view of a shift register in accordance with one more embodiment of our invention.

An extension of the principle that ion propagation path can be made to turn corners is depicted in FIG. 12, a Y-branch device, which incorporates electrode configurations akin to those described with reference to FIG. 10. Ions from source 129 are made to propagate along a main channel 122 to a region where the main channel splits or branches into N channels 124.1 to 124.N. Then, control signals from a controller (not shown) cause the ions to propagate along one or more of the branching channels 124.1 to 124.N.

We claim:

1. A micro-miniature ion trap device comprising:

a wafer having a major surface, at least one ion trapping plate having an electrically insulating surface, a multiplicity of electrodes disposed on said insulating surface, said electrodes forming an ion trap in a region adjacent said plate when voltage is applied to said electrodes, a multiplicity of electrical conductors coupling said electrodes to said wafer, and a multiplicity of ports for introducing ions into said region and for extracting ions from said region, a first one of said plates being oriented at a non-zero angle to said major surface and being rotateably mounted on said surface.

2. The device of claim 1, further including a second one of said plates oriented essentially parallel to said major surface and disposed integrally within said major surface.

3. The device of claim 1, further including a second one of said plates also oriented at a non-zero angle to said major surface and rotateably mounted on said major surface.

4. The device of claim 3, wherein said first and second plates are oriented essentially perpendicular to said major surface.

5. The device of claim 1, further including a multiplicity of said plates forming a three-dimensional structure having a polygonic cross-section.

6. The device of claim 3, wherein said first and second plates are oriented essentially parallel to one another.

7. The device of claim 1 for use as a shift register, further including at least two of said plates forming an elongated micro-channel have an axis of ion propagation, wherein electrodes on at least one of said two plates are segmented along the direction of said axis, thereby forming a multiplicity of ion traps along said axis, and further including a controller for applying voltage to said segmented electrodes, thereby to shift ions from one trap to another.

8. The device of claim 7, wherein electrodes on both of said two plates are segmented along the direction of said axis.

9. The device of claim 1, wherein at least one of said conductors includes a suspended, flexible serpentine section.

10. The device of claim 9, wherein said plate has an aperture extending therethrough, and said serpentine section is disposed in said aperture.

11. The device of claim 1, further including a multiplicity of said plates forming a micro-cavity therebetween, said ion trap being formed within said cavity.

12. The device of claim 1, wherein said at least one rotateably mounted plated is fixed in position on said wafer.

13. The device of claim 1, wherein said at least one plate is essentially planar.

14. The device of claim 1, wherein said at least one plate is curved.

15. A micro-miniature ion trap device comprising:

a wafer having a major surface, a multiplicity of ion trapping plates forming a micro-cavity therebetween, each plate having an electrically insulating surface, a multiplicity of electrodes disposed on said insulating surface of each of said plates, said electrodes forming an ion trap in said micro-cavity when voltage is applied thereto, a multiplicity of electrical conductors coupling said electrodes to said wafer, and a multiplicity of ports for introducing ions into said cavity and for extracting ions from said cavity, a first one of said plates being oriented at a non-zero angle to said major surface, being rotateably mounted on said surface, and being fixed in position on said surface.

16. The device of claim 15, wherein said first plate is essentially planar.

17. The device of claim 15, wherein said first plate is curved.

18. A method of making a micro-miniature ion trap device comprising the steps of:

(a) providing a wafer having a major surface, (b) forming a multi-layered structure on said surface, said structure including at least one plate deposited thereupon, said plate having a multiplicity of electrodes thereon and a multiplicity of electrical conductors coupling said electrodes to said wafer, (c) etching selected portions of said structure to release said plate therefrom so that said plate is rotateably mounted on said surface, (d) rotating said plate so that it is oriented at a non-zero angle to said surface, and (e) fixing said plate in position at said angle with respect to said surface.

19. The method of claim 18, wherein step (b) includes forming said plate as an essentially planar element that remains essentially planar during step (c).

20. The method of claim 18, wherein step (b) includes forming said plate as an essentially planar element that becomes curved during step (c).

* * * * *